B. H. PRATT.
BLOW-OUT PATCH FOR PNEUMATIC TIRES.
APPLICATION FILED JAN. 31, 1917.
1,226,909.
Patented May 22, 1917.
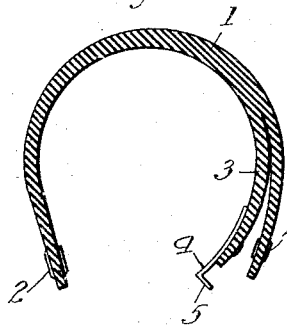
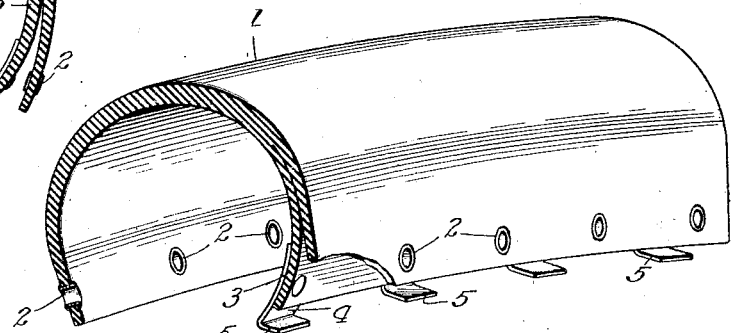
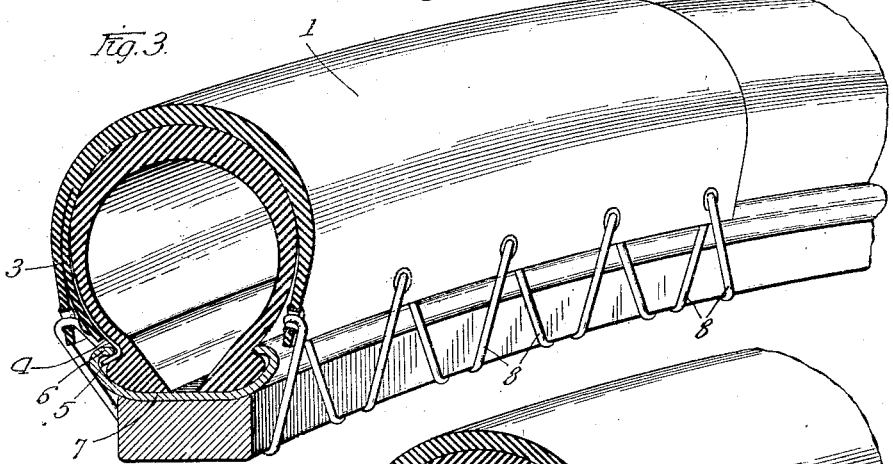
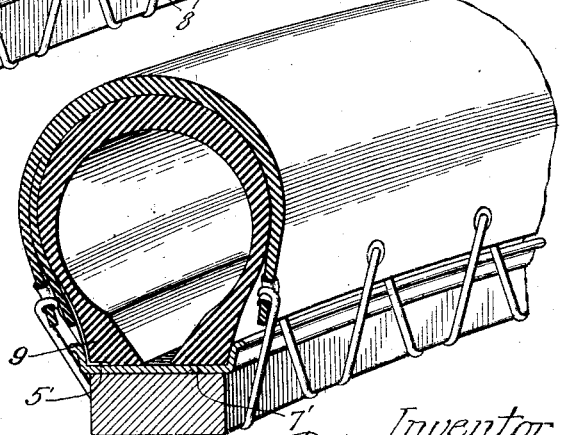

UNITED STATES PATENT OFFICE.

BENJAMIN H. PRATT, OF MILWAUKEE, WISCONSIN, ASSIGNOR TO THE FEDERAL RUBBER COMPANY, OF CUDAHY, WISCONSIN, A CORPORATION OF MASSACHUSETTS.

BLOW-OUT PATCH FOR PNEUMATIC TIRES.

1,226,909.

Specification of Letters Patent.

Patented May 22, 1917.

Application filed January 31, 1917. Serial No. 145,748.

*To all whom it may concern:*

Be it known that I, BENJAMIN H. PRATT, a citizen of the United States, residing at Milwaukee, in the county of Milwaukee and State of Wisconsin, have invented new and useful Improvements in Blow-Out Patches for Pneumatic Tires, of which the following is a specification.

This invention relates to blow-out patches for pneumatic tires.

It relates particularly to that type of blow-out patch which is applied to the tire externally and is commonly known as an "outside" patch.

Blow-out patches of this type as now made may be divided into two main classes; namely, "lace-on" patches and "hook-on" patches.

A lace-on patch is applied to the tire by lacing its edge portions together, the strands of the lacing being usually passed under the felly of the wheel.

The hook-on patch is provided at its edge portions with a series of hooks which engage under the tire rim or under the edge of the tire to hold the patch in place.

Each of the above mentioned types of patches has its advantages and disadvantages.

A lace-on patch does not hug the tire or come in close contact with the sides of the tire near the rim and therefore it is ineffective when used in cases where a blow-out occurs near the tire rim. The main advantage of a lace-on patch is that it may be used on tires of various sizes.

A hook-on patch hugs the sides of the tire or, in other words, comes in close contact with the sides of the tire near the rim and is therefore effective for use in cases where blow-outs occur near the tire rim, but a given patch will fit a tire of one size only. In fact, slight variations in tires supposedly of the same size may prohibit the use of a hook-on patch. This, of course, is due to the fact that the hooks carried by the edges of the patch must engage either under the rim, or under the edge of the tire at each side of the tire and therefore the size of the patch must conform exactly to the size of the tire.

One object of the present invention is to provide a blow-out patch which combines the advantages of both of the above mentioned types of patches and eliminates the disadvantages thereof.

Other objects will appear as the specification proceeds.

Several forms of the improved blow-out patch are illustrated in the accompanying drawing in which—

Figure 1 is an end view of a patch adapted for use on tires of the clencher type;

Fig. 2 is a perspective view of the patch shown in Fig. 1;

Fig. 3 is a perspective view of a portion of a tire showing the patch of Figs. 1 and 2 applied thereto; and Fig. 4 is a view similar to Fig. 3 showing a patch adapted for use on tires of the straight sided type.

The improved patch comprises, in general, a sleeve adapted to be applied to the tire in the same manner that a lace-on patch is applied. An inner flap is provided at one side of the patch and this flap is equipped with hooks for hooking the flap to the tire rim or under the tire bead in the same manner that a hook-on patch is applied.

When a blow-out occurs near the rim the patch is so applied to the tire that the above mentioned flap is at that side of the tire where the blow-out has occurred. Due to the fact that this flap is hooked under the rim or under the bead of the tire the flap is held in close contact with the side of the tire at the point where the blow-out has occurred. The patch is then laced on in the same manner that a lace-on patch is applied and therefore variations in the size of the tire are immaterial. The patch may therefore be applied to tires of different size and yet a portion of the patch is in close contact with the tire at the point near the rim where the blow-out has occurred.

In Figs. 1 and 2 the patch is denoted generally by the reference character 1. Each edge portion of the patch is provided with a series of eyelets 2 which permit the patch to be laced upon the tire in the manner described above.

A flap 3 is provided at the inner side of one edge portion of the patch. This flap carries a series of hooks 4 which may be attached to the flap in any suitable manner, such as by means of rivets. These hooks may be made of metal and may have a bent extremity 5. In the case of Figs. 1 and 2 this extremity 5 is bent outwardly to adapt the patch for use on tires of the clencher type.

In Fig. 3 a patch of the type described above is shown applied to a pneumatic tire of the clencher type. When the patch is applied the hooks 4 are inserted under the curved edge 6 of the tire rim 7 at that side of the tire where the blow-out has occurred. The main edge portions of the patch are then laced together by means of the lacing 8, the strands of which pass under the rim 7 as shown in Fig. 3. Obviously, if the blow-out has occurred near the tread of the tire it is immaterial whether the hooks 4 be made to engage the rim at one side of the tire or at the other.

It will now be noted that the patch may be laced in place regardless of whether the patch exactly fits the tire or not. Furthermore, when the patch is applied the flap 3 contacts closely with one side of the tire. The flap 3 may therefore be made to cover that portion of the tire in which the blow-out has occurred, provided the blow-out is near the rim or bead of the tire. If it were not for the flap 3 the lower edge portions of the patch would be held in spaced relation with the converging side faces of the tire by the lacing as shown in Fig. 3. The patch would therefore not be useful in cases where a blow-out occurs near the rim. This is the disadvantage mentioned above of the usual lace-on type of patch. Furthermore, if hooks 4 were provided at both sides of the patch the patch would fit only one size of tire and this is the disadvantage mentioned above of the usual hook-on patch. These disadvantages of the hook-on and lace-on types of patch are overcome in the present type of patch but their advantages are retained; that is, the patch may be laced upon the tire and may therefore be used with tires of various sizes and yet the patch closely contacts with one side of the tire near the rim. A patch is seldom required to closely contact with both sides of the tire near the rim because two blow-outs seldom occur in a tire near the rim at opposite points. The present patch therefore, with its single flap 3, is adapted for use in all cases of blow-outs which are likely to occur in practice.

In Fig. 4 a patch is shown which is adapted for use on a tire having straight sides. The only alteration in the patch described above which is necessary to adapt the patch for use on a tire of the straight sided type is to form the hooks 4 so that the bent extremities 5 are bent inwardly instead of outwardly and to make the hooks slightly longer so that they will reach to and under the edges of the tire.

A patch constructed in this manner is shown applied to a tire of the straight sided type in Fig. 4. The patch is applied in the same manner as explained in connection with Fig. 2 except that the bent extremities 5' of the hooks are caused to engage under one edge 9 of the tire as shown in the figure. It will be noted that the tire shown in Fig. 4 is of the straight sided type and that the rim 7' is of that type which is usually used in combination with straight sided tires.

A blow-out patch constructed in accordance with the present invention may be readily applied to the tire and variations in the size of the tire do not affect its usefulness. In fact, a single patch may be used on tires of various sizes. The patch is so constructed that a portion of the same is held in close contact with one side of the tire so that when a blow-out occurs in the tire near the rim the patch properly performs its function at the point of blow-out. The patch may therefore be used for blow-outs in any portion of the tire regardless of whether they occur in the tread, on the side, or near the rim.

The patch has been described for use in case of blow-outs which have actually occurred but it may, of course, be used to protect the tire from blow-outs.

Although the patch has been described for use in case of "blow-outs" it is obvious that it is also serviceable for cuts, fabric breaks, etc.

The improved patch has been described in detail for illustrative purposes only and it will be understood that the patch may take various other different forms without departing from the spirit or scope of the invention as defined in the accompanying claims.

What I claim is:

1. A blow-out patch for pneumatic tires having a series of eyelets along each edge portion, an inner flap associated with one side of the patch, and a series of hooks carried by said flap.

2. A blow-out patch for pneumatic tires having means whereby the patch may be laced upon the tire, an inner flap associated with one side of the patch, and a series of hooks carried by said flap.

3. A blow-out patch for pneumatic tires having a series of eyelets associated with one side thereof, and a series of eyelets and a series of hooks associated with the other side of the patch.

4. A blow-out patch for pneumatic tires having means whereby the patch may be laced upon the tire, a flap associated with one side of the patch, and means whereby said flap may be fixedly held near the bottom of the tire.

5. A blow-out patch for pneumatic tires having means for fixedly holding one side of the patch near the bottom of the tire, and means whereby the opposite side of the patch may be laced to that side of the patch which is fixedly held.

6. A blow-out patch for pneumatic tires having means for fixedly holding one side of the patch near the bottom of the tire, and means for adjustably connecting the opposite side of the patch to that side of the patch which is fixedly held.

7. A blow-out patch for pneumatic tires provided at both sides with means for lacing the patch to the tire and provided at one of the sides only with means for fixedly hooking such side of the patch near the bottom of the tire.

8. A blow-out patch for pneumatic tires having means for hooking one side of the patch near the bottom of the tire, and means for lacing the patch upon the tire.

9. A blow-out patch for pneumatic tires having means for fixedly hooking one side of the patch so that it will be in close engagement with one side of the tire adjacent to the rim and means for adjustably fastening the patch upon the tire.

10. A blow-out patch for pneumatic tires having means whereby the patch may be laced upon the tire, a flap associated with one side of the patch, and means whereby said flap may be held in close engagement with the side of the tire near the rim.

11. A blow-out patch for pneumatic tires having means whereby the patch may be adjustably applied to the tire, a flap associated with one side of the patch and means whereby said flap may be held in close engagement with the side of the tire near the rim.

In witness whereof, I have hereunto subscribed my name in the presence of two witnesses.

BENJAMIN H. PRATT.

Witnesses:
  J. M. TAIT,
  C. R. KOSS.

Copies of this patent may be obtained for five cents each, by addressing the "Commissioner of Patents, Washington, D. C."